Patented Sept. 30, 1952

2,612,436

UNITED STATES PATENT OFFICE 2,612,436

METHOD OF PREPARING ALKALI METAL AMIDES

Johan Overhoff and Johannes Thomas Hackmann, Amsterdam, Netherlands, assignors to Shell Development Company, San Francisco, Calif., a corporation of Delaware No Drawing. Application July 29, 1947, Serial No. 764,590. In the Netherlands October 21, 1940

Section 1, Public Law 690, August 8, 1946
Patent expires October 21, 1960

2 Claims. (Cl. 23—190)

This invention relates to an improved method of preparing and utilizing alkali metal amides. More particularly the invention provides a process for the production of alkali metal amides from ammonia and an alkali metal without the necessary employment of temperatures above the melting point of the resulting amide or below the boiling point of liquid ammonia. In its most specific embodiment the invention provides an improved method for preparing alkali metal amide-containing reaction mixtures and for the employment of said mixtures to attach amino groups to organic molecules.

The methods heretofore commonly employed for the preparation of alkali metal amides from the metal and ammonia have certain inherent disadvantages. Two general types of reaction processes have been most commonly employed. One such process comprises a reaction between gaseous ammonia and the molten alkali metal at a temperature above the melting point of the amide to be produced, generally a temperature of about 380° C. is employed. The second commonly employed production process was conducted by dissolving the alkali metal in a liquid ammonia solution in the presence of various inorganic materials as catalysts.

While good yields of relatively pure amides are obtained by either process, certain practical considerations in each case create serious disadvantages. The alkali metal amides are violently reactive with water and must be entirely excluded from contact with moisture. The particular commercial value of alkali metal amides is in the preparation of organic amino compounds, and for this purpose they are preferably employed in the form of a finely divided suspension in an inert organic solvent. While fused amides can be economically produced by the first mentioned process, the pulverizing of the "melt" in the absence of moisture to form reactive suspensions in inert liquids presents a serious problem. On the other hand, while reactive suspensions of alkali metal amides may be readily produced by the second process (by adding an inert solvent to the liquid ammonia reaction medium prior to evaporating the excess ammonia) liquid ammonia is a comparatively expensive reagent and requires the employment of reaction temperatures below about —33° C. or exceedingly high reaction pressures.

A principal object of the present invention is therefore the provision of a process for the production of highly reactive alkali amide suspensions employing low cost reagents and conducted under readily obtainable reaction conditions. A further object is the provision of a process for the production of alkali metal amides by the reaction of ammonia and an alkali metal conducted in an inert reaction medium in the presence of a mixed catalyst at moderately elevated temperatures and pressures. Another object of the invention is the employment of the reaction product of ammonia and an alkali metal in an inert solvent reaction medium in the presence of a mixed catalyst for the introduction of amino groups into organic molecules in a single operational step. Still other objects and advantages of the invention will be apparent from the following description.

While various inorganic materials (more fully described below) catalyze the reaction of an alkali metal with ammonia when dissolved in an excess of liquid ammonia, if an immiscible solvent is added a polyphase system with the alkali metal and ionic catalysts in one or more solid or liquid phases separate from the ammonia phase is formed, and the reaction stops or becomes inoperatively slow. It has now been surprisingly discovered, however, that in the presence of a small amount of certain amino group-containing compounds which are weaker bases than ammonia, the components of such a polyphase reaction system react rapidly to produce alkali metal amides in practically quantitative yields.

The present process may therefor be generally stated to comprise the formation of alkali metal amides by a reaction between an alkali metal and ammonia in an inert liquid reaction medium at moderately elevated temperatures in the presence of (1) an inorganic catalyst for the reaction of an alkali metal with ammonia in a liquid ammonia system, and (2) a basic compound containing amino groups, one or more of which contain at least one hydrogen atom attached to the nitrogen atom, and which compound is a weaker base than ammonia.

Inorganic materials which are catalysts for the reaction of an alkali metal with ammonia when dissolved in liquid ammonia include numerous metals and metal salts, such as ferric nitrate, ferric oxide, platinum and sodium peroxide. Many suitable inorganic catalysts are described in U. S. Patent 2,163,100, and it is preferable to employ an oxide of an alkali metal together with a small amount of an ammonia-soluble hydrated salt of iron, cobalt or nickel as described in U. S. Patent 2,202,994.

The reaction is preferably conducted at moderately elevated temperatures and usually under atmospheric pressure. The particular temperatures and pressures employed in the reaction are not critical, but a higher rate of reaction is obtained at temperatures of from about the melting temperature of the alkali metal to the decomposition temperature of the particular inert reaction medium employed, and temperatures of from about 100° C. to 200° C. have been found to be particularly effective. Pressures of even less than atmospheric may be employed where the reaction medium is particularly miscible with ammonia; however, pressures substantially equal to or above normal atmospheric are generally preferred.

Suitable "liquid reaction mediums" may consist of substantially any material which is liquid at the reaction temperature and is substantially inert to the reaction components. It is generally preferable to employ a liquid boiling substantially above the reaction temperature to be employed. The reaction medium need not be a solvent for the alkali metal or the inorganic catalyst, but where low reaction pressures are used it is generally preferable to employ a substance in which ammonia and amino group-containing compounds are appreciably soluble under the reaction conditions. A higher molecular weight hydrocarbon such as a paraffin oil or a spindle oil, or a N,N-dialkyl arylamine is a particular suitable reaction medium since, in addition to being inert to the reactants and having an appreciable solubility for ammonia and amines under the reaction conditions, they have boiling points sufficiently high to allow the employment of temperatures within the most desirable range. Illustrative examples of such particular suitable solvents include, dimethylaniline, decalin, paraffin oil, spindle oil, Russian oil, diethylaniline, naphthaline, vaseline oil, toluene, alkyl-toluenes, alkylnaphthalines and the like.

As mentioned above, we have found the presence of an amino group-containing compound is essential ot cause the components of the polyphase reaction system to react at a practical rate and produce good yields of the desired product. The amino group-containing compounds need only be present in small amounts (as little as about 0.5% based on the total weight of the reaction mixture is productive of almost quantitative yields) and can either be added to the reaction or be formed in situ therein as, for example by employing a small amount of pyridine and sodamide, thereby forming aminopyridine within the reaction medium. While the invention is not predicated upon any particular theory of intermediate reaction between the components of the polyphase system. it would seem that a reaction does not occur directly between the alkali metal and ammonia, but follows the course indicated below where aminopyridine illustrates the amino group-containing catalyst.

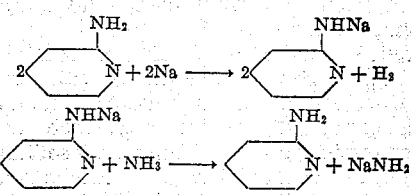

A suitable basic compound comprises substantially any basic compound containing amino groups one or more of which contain at least one hydrogen atom attached to the nitrogen atom and which is less basic than ammonia i. e., has a basicity in the range of the arylamines. Such compounds which are not volatilized at the reaction temperatures and which are soluble in the inert liquid reaction medium employed are particularly suitable for employment as the organic component of the mixed catalyst for the present process. Illustrative examples of individual compounds which may be so employed include, phenylhydrazine, naphthylamine, aminopyridine, hydrazine aniline, naphthylhydrazine, N-methyl aniline, diaminopyridine, diphenylamine, aminotoluene, benzylaniline, and the like. The primary aromatic amines in which the amino group is directly attached to a mono or poly-aromatic nucleous (including nitrogen containing rings such as the pyridyl ring, as in the case of aminopyridine or amnionaphthalene, or is attached through an amino nitrogen atom to such an aromatic nucleus, as in the case of phenylhydrazine, form a particularly preferred subclass.

The present process may be conducted in any apparatus suitable for chemical reaction employing alkaline materials. A thorough mixing of the reactants during the course of the reaction is advantageous, particularly when the process is conducted at atmospheric pressures. The alkali metal amide as it is produced remains suspended in the inert reaction medium in a finely divided and highly reactive form.

The application of the process to the production of a pure alkali metal amide is illustrated by the following typical preparation of sodamide.

*Example I.—Preparation of sodamide*

The following reactants in the indicated amounts were introduced successively into a round bottomed Pyrex flask:

200 mls. dimethylaniline
0.6 g. pulverized ferric nitrate
1.0 g. sodium peroxide
5.0 g. 2-aminopyridine
46 g. sodium The air above the reaction mixture was replaced by "sweeping out" with gaseous ammonia (nitrogen or other inert gases may similarly be used) and the reactants heated to a temperature of between 140° C. to 170° C. under the dry atmosphere while being continuously stirred. When the sodium becomes molten and thoroughly dispersed in the reaction medium, ammonia is continuously introduced as the reaction progresses and hydrogen is evolved. In about 5½ hours 24 liters of hydrogen (the theoretical quantity produced by the conversion of all of the sodium) was evolved and all of the sodium had disappeared. The introduction of ammonia was stopped and the contents of the flask were cooled under the blanket of gaseous ammonia. The reaction products were filtered under an atmosphere of nitrogen and the sodamide worked with two 50 ml. portions of gasoline. A 98% yield of sodamide was obtained in the form of finely divided white crystals.

In addition to its application for the production of alkali metal amides, the present process provides an improved method of introducing amino groups into organic compounds, preparing metal azides and the like, essentially employing ammonia and the free alkali metal as starting materials.

The following examples illustrate the employment of the alkali metal amides in solution as produced by the present process for the aminization of organic compounds.

Example II.—Preparation of 2-aminopyridine

The following reactants were successively introduced into an iron reaction vessel having a capacity of about 8 liters.

1600 mls. dimethylaniline (technical grade)
4.8 g. finely powdered ferric nitrate
8.0 g. sodium peroxide
32 g. pyridine
32 g. sodamide
368 g. sodium The reactants under a blanket of gaseous ammonia were heated to a temperature of 150° C. to 160° C. with vigorous stirring. Ammonia was continuously introduced as the reaction progressed. After about 3 hours 15 mls. of pyridine was introduced and followed by an addition of 5 mls. after 4½ hours. The introduction of the additional amounts of pyridine causes a marked increase in the rate of the reaction. After the contents of the flask had been maintained at the reaction temperature for a total of 5½ hours, they were allowed to stand overnight. Subsequently the reaction mixture (consisting primarily of a suspension of sodamide in dimethylaniline) was heated to about 100° C. and 8 moles (632 g.) of pyridine added. The resulting mixture was maintained at between 125° C. and 130° C. for 5 hours without stirring.

The sodium addition compound was then decomposed by the addition of 5 liters of water, and the organic components extracted with three 500 ml. portions of carbon tetrachloride followed by some 500 ml. portions of ether. Upon evaporation of the solvents a yield of 420 g. or 51.6% of the theoretical yield of 2-aminopyridine was obtained.

Example III.—Preparation of 2-aminopyridine

The following compounds were successively introduced into a round bottomed flask having a capacity of 1 liter:

200 mls. paraffin oil
0.6 g. pulverized ferric nitrate
1.0 g. sodium peroxide
4.0 g. pyridine
4.0 g. sodamide
59 g. sodium The reaction mixture was treated as described in Example I to produce sodamide and during a reaction period of 6½ hours pyridine in 5 ml. portions was added three times. At the end of this period the contents of the flask were allowed to cool and 1 mole (79 g.) of pyridine was added. The resulting mixture was slowly heated to about 125° C. and maintained at this temperature while hydrogen was evolved (about 5 hours).

After standing overnight the sodium addition compound was decomposed by the introduction of 500 mls. of water, and the water layer so formed was extracted with three 200 ml. portions of carbon tetrachloride followed by a 150 ml. portion of ether. After evaporation of the solvents the organic reaction products were combined with the paraffin oil layer and subjected to a vacuum distillation. A yield of 59.5 g. or 53.1% of the theoretical yield of 2-aminopyridine was distilled over at 100° C. under 15 mm. pressure.

Example IV.—Preparation of 1,6-diaminonaphthol

A suspension of sodamide was prepared as described in Example III.

To the cooled suspension 50 g. of beta-naphthol was added and the mixture was heated to 220° C. with stirring. In 2 hours the evolution of hydrogen had stopped and the reaction mixture was allowed to cool. The liquid components of the reaction mixture were decanted into an excess of ice-water.

The water solution was acidified, and after removal of the paraffin oil layer filtered. The precipitated amine salt was then decomposed with ammonium carbonate and the crude 1,6-diaminonaphthol was purified by recrystallization.

A yield of 37 g. or 66% of the 1,6-diaminonaphthol theoretically obtainable was thus recovered.

The invention claimed is:

1. A method of preparing sodamide which comprises forming a dispersion of sodium in dimethyl aniline in the presence of (1) an inorganic catalyst mixture consisting of ferric nitrate and sodium peroxide and (2) a minor amount of 2-aminopyridine, heating the suspension so formed with stirring to a temperature between 140° C. and 170° C. and introducing gaseous ammonia until the utilization of ammonia and the evolution of hydrogen was ceased.

2. The process for the production of an alkali amide which comprises reacting ammonia at a temperature of from about 100° to about 200° C. with an alkali metal, said alkali metal being dispersed in an N,N-dialkylarylamine, and in the presence of (1) a catalyst consisting essentially of an oxide of an alkali metal in admixture with an ammonia-soluble hydrated salt of a metal selected from the group consisting of iron, cobalt and nickel, and (2) at least 0.5% by weight of the reaction mixture of a primary aryl amine.

JOHAN OVERHOFF.
JOHANNES THOMAS HACKMANN.

REFERENCES CITED

The following references are of record in the file of this patent:

UNITED STATES PATENTS

| Number | Name | Date |
|---|---|---|
| 1,570,467 | Evan | Jan. 19, 1926 |
| 1,789,022 | Philipp | Jan. 13, 1931 |
| 1,938,890 | Britton et al. | Dec. 12, 1933 |
| 2,000,411 | Morrell et al. | May 7, 1935 |
| 2,104,407 | Thomas | Jan. 4, 1938 |
| 2,106,180 | Kreimier | Jan. 25, 1938 |
| 2,163,100 | Miller et al. | June 20, 1939 |
| 2,202,994 | Nieuwland | June 4, 1940 |

FOREIGN PATENTS

| Number | Country | Date |
|---|---|---|
| 1,613 | Great Britain | A. D. 1915 |
| 358,397 | Germany | Sept. 11, 1922 |
| 362,446 | Germany | Oct. 27, 1922 |
| 742,255 | Germany | Sept. 25, 1941 |

OTHER REFERENCES

"Ind. Eng. Chem.," vol. 32, 1940, pages 173–178 (Shreve et al.).

"Sidgwick's Organic Chemistry of Nitrogen," Taylor et al., Oxford, 1937, pages 40 and 529.